(12) United States Patent
Green

(10) Patent No.: US 7,321,906 B2
(45) Date of Patent: Jan. 22, 2008

(54) METHOD OF IMPROVING REPLICA SERVER PERFORMANCE AND A REPLICA SERVER SYSTEM

(75) Inventor: Thomas Green, New York, NY (US)

(73) Assignee: OMX Technology AB, Stockholm (SE)

( * ) Notice: Subject to any disclaimer, the term of this patent is extended or adjusted under 35 U.S.C. 154(b) by 476 days.

(21) Appl. No.: 10/897,436

(22) Filed: Jul. 23, 2004

(65) Prior Publication Data

US 2006/0020635 A1  Jan. 26, 2006

(51) Int. Cl.
*G06F 12/00* (2006.01)

(52) U.S. Cl. .................................. 707/204; 707/104.1

(58) Field of Classification Search ............. 707/104.1, 707/1, 5–9, 201, 204
See application file for complete search history.

(56) References Cited

U.S. PATENT DOCUMENTS

| | | | |
|---|---|---|---|
| 5,455,932 A | 10/1995 | Major et al. | |
| 5,745,753 A | 4/1998 | Mosher, Jr. | |
| 5,941,999 A | 8/1999 | Matena et al. ................. | 714/6 |
| 6,035,415 A | 3/2000 | Fleming | |
| 6,178,441 B1 | 1/2001 | Elnozahy .................... | 709/203 |
| 6,289,357 B1 | 9/2001 | Parker | |
| 6,304,980 B1* | 10/2001 | Beardsley et al. ............. | 714/6 |
| 6,411,991 B1 | 6/2002 | Helmer et al. | |
| 6,446,090 B1* | 9/2002 | Hart ........................... | 707/201 |
| 6,526,487 B2 | 2/2003 | Ohran et al. | |
| 6,842,825 B2* | 1/2005 | Geiner et al. ................ | 711/133 |
| 7,111,004 B2* | 9/2006 | Beardsley et al. ............. | 707/8 |
| 7,130,974 B2* | 10/2006 | Iwamura et al. ............ | 711/162 |
| 2001/0047412 A1 | 11/2001 | Weinman, Jr. | |
| 2002/0065827 A1 | 5/2002 | Christie et al. | |
| 2002/0194203 A1 | 12/2002 | Mosher, Jr. | |
| 2003/0093638 A1 | 5/2003 | Margerie et al. | |
| 2003/0187847 A1* | 10/2003 | Lubbers et al. ................ | 707/9 |
| 2003/0212869 A1 | 11/2003 | Burkey | |
| 2004/0044865 A1 | 3/2004 | Sicola et al. | |
| 2004/0215596 A1* | 10/2004 | Fukuhara et al. .............. | 707/1 |
| 2005/0027737 A1* | 2/2005 | Micka et al. ............. | 707/104.1 |

FOREIGN PATENT DOCUMENTS

WO  2004/017194 A2  2/2004

OTHER PUBLICATIONS

International Search Report mailed Feb. 8, 2006 in corresponding Application PCT/EP2005/053090.

* cited by examiner

*Primary Examiner*—Wilson Lee
(74) *Attorney, Agent, or Firm*—Nixon & Vanderhye P.C.

(57) ABSTRACT

A method of improving replica server performance in a replica server system is described. The method comprises: transferring input data from a primary replica to a secondary replica upon receiving same; storing said input data on the primary replica; processing said input data in the primary replica after storing said input data, thus creating original output data; sending confirmation data from the secondary replica to the primary replica upon receiving said input data; and sending out said original output data from the primary replica upon receiving said confirmation data from said secondary replica. A replica server system for performing the method is also described.

12 Claims, 3 Drawing Sheets

METHOD OF IMPROVING REPLICA SERVER PERFORMANCE AND A REPLICA SERVER SYSTEM

FIELD OF THE INVENTION

The present invention relates to replica server systems.

BACKGROUND

Failsafe operation of information technology systems is of fundamental importance for most modern society activities. Due to this there are many precautionary systems that are made to handle situations of failure.

Such systems could comprise safeguarding of information via memory backup systems as well as safeguarding of complete system functionality. The latter could comprise completely mirrored or redundant systems, where all actions are executed in primary and secondary system components (computer, processor, server, etc).

One such failsafe system is disclosed in U.S. Pat. No. 6,526,487, where memory contents are synchronised. A primary computer system includes a memory and a delay buffer receiving write requests for data to be stored in the memory. The content of the delay buffer is transferred to a backup computer system. When the transfer is complete, the backup computer system acknowledges that the data has been received, whereupon the primary computer system proceeds by executing the write request. Hereby, the two systems are synchronised at all times and any failures occurring before the acknowledgement is received will result in the write request not being executed.

In the financial field, e.g. electronic exchange systems for stocks, bonds, derivates, etc, failsafe high-speed in-memory servers are used. These systems are also referred to as replica server systems. Similar to the above disclosed system, a replica server system comprises a primary replica and a secondary replica, both being identical and in the same state. Should the primary replica fail, the secondary replica will take over immediately. Of course, the system may contain several secondary replicas to improve safety. Upon failure of the primary replica, one of the secondary replicas will then become a new primary replica, while the others remain as secondary replicas.

One pronounced problem with replica server systems and other similar systems is lag times. In a replica server the primary replica receives an input data, stores this to a buffer (normally in an I/O interface), writes it on a persistent memory, e.g. a disc (by flushing the buffer), transfers the input data to the secondary replica (or replicas), wait for the secondary replica to store the input data in a buffer, write the input data on its own persistent memory (disc) and acknowledge receiving the input date, whereupon the primary replica can process the input data and output the processed data (via the I/O interface, thus also storing the output data in the buffer).

In particular writing to a disc (or whichever persistent memory that is used) normally is very time consuming for a system that is supposed to be able to handle thousands (or more) parallel transactions or events. Basically, writing takes about 5.8 ms (flush time) for a normal disc drive (15 000 rpm and a seek time of 3.8 ms). There are also certain systems available (such as RAID and SAN systems, as well as RAM discs) that have enhanced write performance—these system are however very expensive.

Another problem with replica server systems is capacity, i.e. number of events or transactions that are possible to perform each time unit.

In replica server systems handling financial transactions (e.g. electronic exchange) flush is made for every new entered input data in both the primary replica and the secondary replica(s). In view of the above noted flush time of 5.8 ms for each event, the limit for the system will be about 170 transactions per second (TPS). In order to enhance this rate, electronic exchanges of today may need to use the expensive systems for enhancing write performance. Such investments however require high liquidity on the exchange (high number of transactions) in order to pay off.

The secondary replica also processes the input data to create duplicate or replica output results. When the primary replica and secondary replica are located at large distances, even different continents, network latency is also noticeable. Here, however, state of the art systems can provide fairly low latency times even for transcontinental communication. For instance, it is possible to obtain 100 MB broadband between New York and Chicago. This carries a network latency of 1 ms or less, which is a great improvement as compared with telephone or satellite communications that can carry round-trip times of 60-500 ms. Together with flush write time, the total lag time can thus be significant.

The reason for this procedure in financial systems is of course to be as failsafe as possible. But even so, there exist other problems that could still cause vital effects for uninterrupted operability of the system. Vulnerability to systematic errors is always present and could for example be caused by logical errors such as division with zero. Such errors could actually cause all replicas to fail, since it is not until after acknowledgement that such error becomes evident. Since all information is written on disc (persistent memory) before processing it, however, the known systems can be restored and resume their operation (after skipping the event causing the crash). Such restoration of course takes time and meanwhile all activities (in case of an electronic exchange all handling in the financial commodity) are closed down.

There is thus a need for a faster and even more reliable replica server system. Especially a system that can operate in failsafe mode while operating large numbers of parallel transactions.

SUMMARY

A method and system of improving replica server system performance are provided. In an example, non-limiting embodiment of the method, input data received by a primary replica is immediately transferred to a secondary replica. Once the secondary replica has received the input data it acknowledges this by returning confirmation data. Simultaneously the primary replica stores the input data to buffer and processes the same without delay to create output data. When the confirmation data is received, the output data is sent out from the primary replica.

Notably, there is with this method no need to flush the buffer for every event to maintain the safety of the entire system, thus avoiding the time-consuming write time. Buffering and processing time will normally not increase total time from input to output since network latency (transfer of input data to the secondary replica and transfer of confirmation data to the primary replica) is then normally longer.

In a slow network it may still be possible to write data to disc for each event within the network latency time without effecting total time for a single event (input to output). However, by skipping the flushing, capacity is increased immensely. An ordinary PC could handle about 170 000 TPS without flushing which is 1 000 times more than with flushing.

Safety is still maintained for the replica server system. Since the output data is not sent until acknowledgement from the secondary replica is received, there is no actual need to maintain a completely synchronised system of primary replica and secondary replica. As long as no output is sent from the system, the input sequence is irrelevant. Should the primary replica fail, the secondary replica will proceed uninterrupted and process the input data from the buffer in due time and same order as the primary replica and produce the output data.

In another non-limiting, example embodiment of the method, the secondary replica will postpone processing the input data until a next input data is received from the primary replica, indicating that the primary replica is still operating. This prevents any systematic faults from being transferred to the secondary replica (or secondary replicas when more than one is used). System safety is thus almost completely failsafe. As long as one secondary replica is operational, the processing will continue uninterrupted. Should the primary replica fail and a systematic error is suspected, the secondary replica will not process the corresponding input data but instead label it as a suspicious operation and return a refusal to operate to the (external) source of the input data. Needless to say, this further makes the use of flushing unnecessary. There is no need to be able to restore the entire replica system from written data since no systematic errors will proceed to the secondary replica.

Should the number of received input data exceed the processing times for the primary replica (for instance, input B, C and D arrives and are transferred to secondary replica even before input A has been processed) there is a risk that the secondary replica proceeds and starts to process input A before the primary replica has finished processing input A. This situation can be countered or prevented in a number of ways.

One way would be to refuse new input data (i.e. input B, C, D etc.) until input A has been processed. The drawback of this is of course the limitation in number of transactions that can be performed.

Another way would be to wait with the processing of input A in the secondary replica until 5 or any other reasonable number of input data has arrived, the number of inputs being chosen so that it is ascertained that the primary replica has had time to process input A. An obvious drawback of this way is of course that the secondary replica must always lag behind a number of operations, even if there are no new input data and the primary replica is operational.

A third example alternative is to send information data from the primary replica indicating which input data is currently being processed (or that was last processed). Thereby, the processing in the secondary replica can be postponed until the information data indicates that input A did not cause a failure in the primary replica. A major benefit of the third alternative is that the primary can send information data indicating its functionality even if no new input data has arrived for a certain time period (e.g. 0,1 sec.). The primary replica and secondary replica will therefore from time to time (depending on number and frequency of input data) be completely synchronised.

It may be necessary to limit the number of input data being queued up for transferral to the secondary replica, since overloads of the replica server system should be avoided. In such case, the primary replica will have to refuse any input data when the queue limit has been reached.

In non-limiting example embodiment of a replica server system, a primary replica includes a primary input, a primary output, a primary storage, and a primary processor and a secondary replica includes a secondary input, a secondary output, a secondary storage and a secondary processor, whereby said primary replica is configured to transfer received input data to the said secondary replica, store said input data, process said input data to create original output data and send out said original output data through said primary output after receiving confirmation data that said input data has been received by said secondary replica, and said secondary replica being configured to generate said confirmation data upon receiving said input data. Said secondary replica is further configured to store said input data in said secondary storage and process said input data in said secondary processor to create replica output data.

It may here be noted that in the present application a distinction is made between "store" and "write", where the former indicates normal buffering in an I/O interface or corresponding storage and the latter indicates flushing or similar time-consuming transfer of data to a persistent memory. The stored data in the buffer or storage can be written to a memory at longer time intervals (when buffer or storage gets full), but this will not impede on the overall improvements for the replica server system according to the invention in comparison to known replica server systems.

Advantageously said secondary replica is further configured to postpone processing of said input data in said secondary processor until at least one next input data has been received. Systematic errors are thus avoided. As mentioned above in connection with the example method, the secondary replica may wait for 5 or more next input data before processing the input data.

Alternatively, the replica server system may also postpone processing in the secondary replica until information data from the primary replica indicates that the input data has been successfully processed.

In another non-limiting example embodiment of a replica server system, the replica server system comprises primary replica means, secondary replica means, means for communicating internally between said primary replica means and said secondary replica means and externally between said primary replica means and external sources, said means for communicating being configured to transfer input data received by said primary replica means to said secondary replica means, means for storing said input data in said primary replica means, means for processing said input data in said primary replica means, thus creating original output data, means for generating confirmation data in said secondary replica means upon receiving said input data and transfer said confirmation data to said primary replica means via said means for communicating, means for outputting said original data via said means for communicating when said original output data has been created and said confirmation data has been received by said primary replica means. The secondary replica means can further comprise means for storing said input data in said secondary replica means and means for processing said input data in said secondary replica means, thus creating replica output data.

In an example embodiments said secondary replica means comprises means for inhibiting said means for storing said data in said secondary replica means and said means for processing said input data in said secondary replica means until at least one next input data is received from said primary replica means via said means for communicating.

Also for this example embodiment, the primary replica means may generate information data indicating its process status and processing in the secondary replica means is postponed until the information data indicates that the input data has been successfully processed.

DETAILED DESCRIPTION

Figure 1:
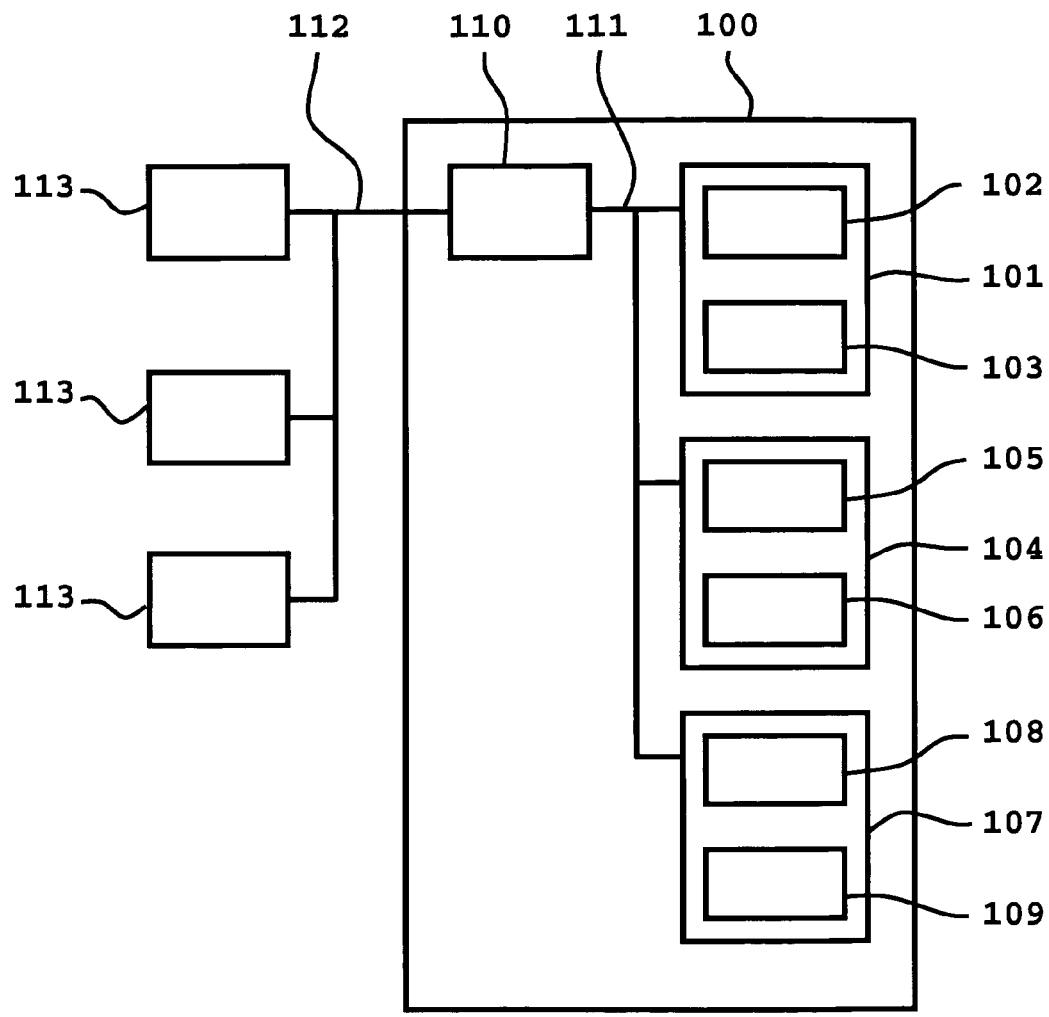
FIG. 1 is a schematic drawing of a first embodiment replica server system shown in an operating environment for the invention.

FIG. 1 generally depicts an example of a replica server system 100. The replica server system 100 comprises a primary replica 101 having inter alia a primary storage 102 for storing information and a primary processor 103 for processing data.

The primary storage 102 is preferably a buffer storage of known kind, but could also include a hard disc memory, a writable CD or DVD disc or any other known persistent memory capacity for data. Unlike prior art replica systems, however, the replica server system 100 will normally not flush after each event to write data on disc (although this may still be included—but that would be less advantageous since flushing normally is the most capacity-limiting step in the process). Normal flushing when the buffer is full can take place (and will do so) to obtain a register of performed transactions.

The primary processor 103 could be any state of the art central processor or combination of processors used in computers, servers, etc.

Further, the replica server system 100 comprises a first secondary replica 104 and a second secondary replica 107. Basically, the replica server system 100 could comprise any number of secondary replicas suitable for the applications of the system. The first secondary replica 104 includes inter alia a first secondary storage 105 and a first secondary processor 106, and the second secondary replica 107 includes inter alia a second secondary storage 105 and a second secondary processor 106, all of which could have the same type of components used for the primary replica 101. In a hardware sense, the primary replica 101 and two secondary replicas 104, 107 can be (and preferably are) identical.

The primary replica 101 and the secondary replicas 104, 107 communicate internally via a communication unit 110 and communication link 111. The communication unit 110 also provides communication with external sources 113 via a communication network 112. The communication network 112 could use different communications channels for different external sources 113, e.g. via Ethernet LAN, telephone, satellite, etc. The external sources 113 could comprise terminals, computers, electronic exchanges or any other device(s) from which data to be processed by the replica server system 100 may originate. The external sources 113 also receive output data from the replica server system 100.

In use input data received from the external sources 113 is routed to the primary replica 101 via the communication unit 110 and communication link 111. The input data is then sent from the primary replica 101 to the secondary replicas 104, 107 via the communication unit 110 and communication link 111. Preferably, the input data is sent immediately from the primary replica 101 upon receiving it.

Similar to the communication network 112, the communication link 111 can comprise several different kinds of wired or wireless components, mainly depending on the location of the secondary replicas 104, 107. For instance, the first secondary replica 104 may be placed in the vicinity of the primary replica 101 and use a broadband connection, whereas the second secondary replica 107 may be placed far away and linked to the primary replica 101 via satellite.

When the secondary replicas 104, 107 receive the input data, they will generate confirmation data (acknowledgement) that they have received the input data and send the confirmation data to the primary replica 101. Preferably, acknowledgment is done immediately upon receiving the input data.

Meanwhile, the input data are saved onto the primary storage 102 and processed in the primary processor 103 in the primary replica 101. Hereby, original output data is created. However, this output data is not sent from the primary replica 101 until it receives the confirmation data indicating that the input data has been received by the secondary replicas 104, 107. When this occurs, the original output data is sent to the external sources 113 via the communication unit 110. It is sufficient for the safety of the replica server system 100 to allow the primary replica 101 to wait for the first acknowledgement from one of the secondary replicas 104, 107. This can essentially reduce latency; cf. the above example with the first secondary replica 104 located nearby and connected via a fast broadband communication link (e.g. Ethernet LAN 100 MB) and the second secondary replica 107 located far away and/or connected via a slow communication link (satellite). Notably, this will reduce latency for individual events or transactions, i.e. time span from input till output, not the number of transactions operable per time unit.

Once the primary replica 101 has sent the input data, it is ready to receive new input data (next input data). In line with what has already been described, once the next input data is received by the primary replica 101, it sends the next input data to the secondary replicas 104, 107 and then proceeds by storing and processing this next input data.

This way of operating the server replica system 100 means that the secondary replicas 104, 107 will not normally be synchronized with the primary replica. In fact, the primary replica 101 could be hundreds or thousands of events ahead of the secondary replicas 104, 107. This does not cause any problems with respect to failsafe operation though. The primary replica 101 only sends (original) output data after receiving the confirmation data from at least one of the secondary replicas 104, 107. Thus, a failure in the primary replica 101 will only cause a slight delay as one of the secondary replicas 104, 107 is appointed as a new primary replica and catches up on the events not yet received by it. Input data that the secondary replicas 104, 107 has received via the primary replica 101 are guaranteed to be processed in the same order by all replicas (101, 104, 107). However, the last number of input data received by the primary replica 101 may not have been transferred to the secondary replicas 104, 107 when the primary replica 101 fails. In such case, the external sources 113 can re-send the input data to the new primary replica (one of secondary replicas 104, 107). Since there are many external sources 113, the order of the input data lost by the primary replica 101 may not be received in the same order by the new primary replica (104, 107). This does not matter since no output was ever sent by the primary replica 101 based on those input data lost.

In certain cases when the secondary replicas 104, 107 receive the next input data, it can be assured that the primary replica 101 has not ceased to operate due to any systematic errors such as logical errors. The secondary replicas 104, 107 can then proceed by storing the input data on respective secondary storages 105, 108 and process the input data on respective secondary processor 106, 109.

Situations may occur where this procedure is not appropriate because the primary replica 101 receives and transfers a number of input data, e.g. input B, input C and input D before processing input A. In such case, the secondary replicas 104, 107 cannot be allowed to process input A only because they receive input B, since input A may still cause a systematic error in the primary replica 101.

One way of solving this would be to delay transferral of input B from the primary replica 101 until input A has been successfully processed. This would however impede on performance of the system and is not preferable.

A more feasible alternative is to wait for a specific number of input data until processing takes place in the secondary replicas 104, 107. For instance, input A is not processed until input E is received by the secondary replicas 104, 107. By selecting a reasonable number of inputs, selected in relation to normal processing time, average input data frequency, etc. functionality can be ascertained. One possible drawback of this is that it may not be possible to detect which input (e.g. input B or input C) that caused a specific failure in the primary replica 101. Thereby, several input data must be refused in order to ascertain the functionality of the secondary replica that assumes the role of a new primary replica.

A more preferable solution is to have the primary replica 101 create information data about its processing state and transfer this to the secondary replicas 104, 107. When transferring input B, input C, etc. to the secondary replicas 104, 107 the primary replica 101 adds information that it e.g. processes input A. Once the primary replica 101 starts informing that it processes input B, the secondary replicas 104, 107 can start processing input A.

Should there be no input data in queue for the primary replica 101 to process, it can still send information data to the secondary replicas 104, 107 indicating it is operational (heartbeat). This is necessary in that particular situation to allow the secondary replicas 104, 107 to process the last received input data (knowing that it did not cause any failure in the primary replica 101). Thereby, the primary replica 101 and secondary replicas 104, 107 can at certain times be in the same state (i.e. fully synchronised). It also enables the server replica system 100 to constantly maintain an alert with respect to general operability. Should there not be any information data from the primary replica 101 for a certain time span, it is assumed to have failed and one of the secondary replicas 104, 107 will be appointed as new primary replica and receive all input data from the external sources 113.

It is also possible to include further safety measures to ensure that the primary replica 101 and secondary replicas 104, 107 operates satisfactorily.

By delaying acknowledgement from the secondary replicas 104, 107 until these have also processed the input data (which they do upon receiving the next input data or the proper information data), a comparison can be made of the result obtained (original and replica output data) by the three replicas 101, 104, 107. If all three have arrived at the same result, all is well. If one has a result that differs from the other two, that replica is stopped (even if it is the primary replica 101). Should all three replicas 101, 104, 107 provide different results, all are assumed faulty and the entire replica server system 100 must be stopped and controlled.

This corresponds to a known fault detecting method also known as Byzantine fault tolerance.

Figure 2A:
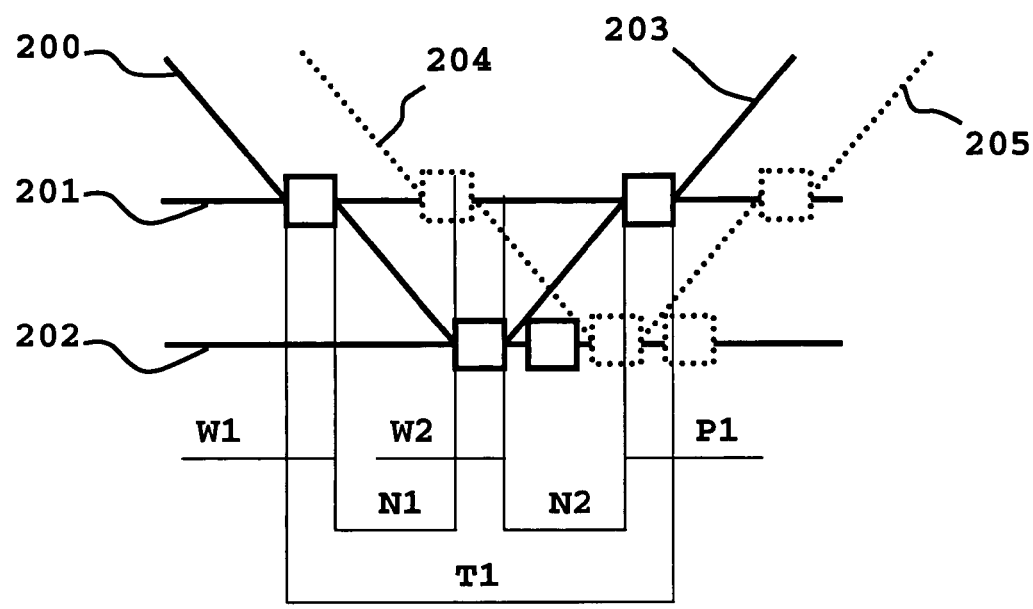
FIG. 2A shows on a schematic event line an event cycle for a state of the art replica server system.
Figure 2B:
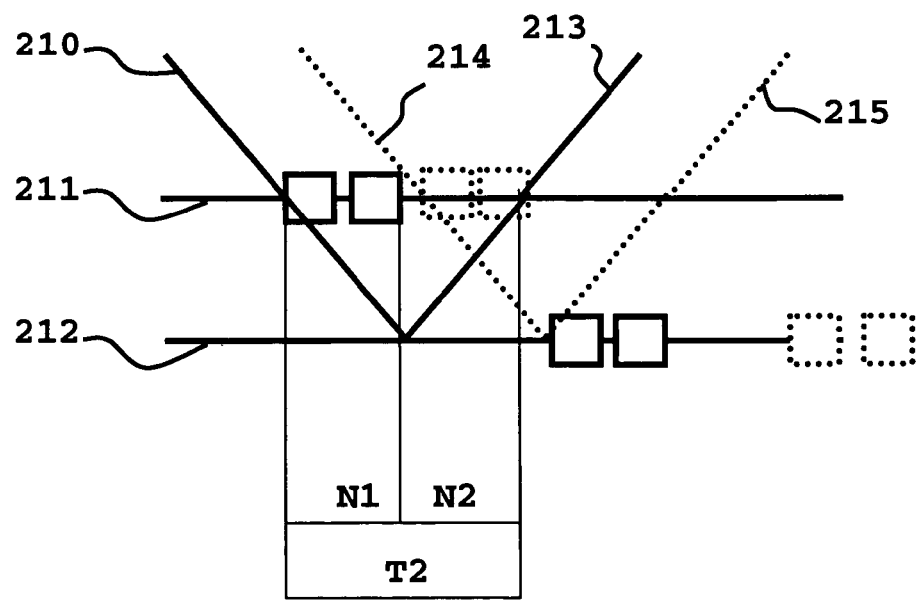
FIG. 2B shows on a schematic event line an event cycle for a replica server system according to the invention.

In FIGS. 2A and 2B, the time saving effects of the invention will be made more obvious. Starting with FIG. 2A, which shows the basic operational steps of a state of the art replica server system.

Input data arrives as indicated with line 200 to a primary replica (represented by event line 201). The input data is stored on disc, a procedure that takes a certain disc write time, represented by designation W1. Following this, the input data is transferred to a secondary replica (represented by event line 202). This process takes time, depending on where the secondary is situated and is represented as network latency time N1. Again, the input data is written to disc, accumulating a second disc write time, W2, to the total time. Once the input data is also written on the secondary replica, acknowledgement (confirmation) is returned to the primary replica. A second network latency, N2, adds to the total time for the procedure. Finally, the primary replica may process the input data, which requires a process time P1 and output the result as indicated with designation number 203.

It should be noted that event lines 201, 202 are not representative as linear real-time indicators. Write time W1, W2 is normally extensively longer than process time P1, for instance. FIGS. 2A and 2B are intended to illustrate the effects and benefits of the invention and not a real-time schedule of the server replica systems operations.

All in all, writing time W1, network latency N1, writing time W2, network latency N2 and process time P1 amounts to an accumulated time $T1=W1+N1+W2+N2+P1$ required to perform one operation (transaction).

Also in FIG. 2A, a next input data is indicated in dotted lines and with designation number 204. The same process is repeated with the next input data—all indicated with dotted lines—which ends with output data as indicated with numeral 205.

In FIG. 2B, one aspect of the timesavings becomes evident. Input data is indicated at 210 and reaches the primary replica (indicated by event line 211). The input data is immediately transferred to the secondary replica (indicated by event line 212), which takes a certain time depending on location of the secondary replica. Here, it is assumed that the placement is the same as in FIG. 2A. It thus requires network latency N1 to transfer the information. As soon as the secondary replica receives the input data, acknowledgement (confirmation data) is sent back to the primary replica, causing time delay of network latency N2. The processed data can be output at 213, i.e. as soon as the input data is processed and confirmation is received from the secondary replica.

As can be seen the network latency N1, N2 exceeds in this case write time and process time. Thus, the total time T2 spent on one operation (transaction) in this case amounts to $T2=N1+N2$. The entire write and process times for the operation has been cut from the total time. In this case, for the individual event it does not really matter to the total time T2 whether a flushed disc write is used or not. However, not using a flushed disc write will increase the number or events that can be processed per time unit. In other words, the next event can arrive much earlier than if a flushed disc write was used.

Also in FIG. 2B, the entire process following the next input data 214 is indicated in dotted lines, ending with a next output data 215. As evident from this, the writing and processing of the input data in the secondary replica does not take place until the next input data 224 has reached the secondary replica. This indicates that the primary is still operative and has not failed due to a systematic error (such as division by zero).

As also mentioned in connection with FIG. 1, the primary replica could send information data regarding its processing state to the secondary replica. In such case, storage and processing in the secondary replica will take place once such information data indicates that the input data has been processed successfully.

Figure 3:
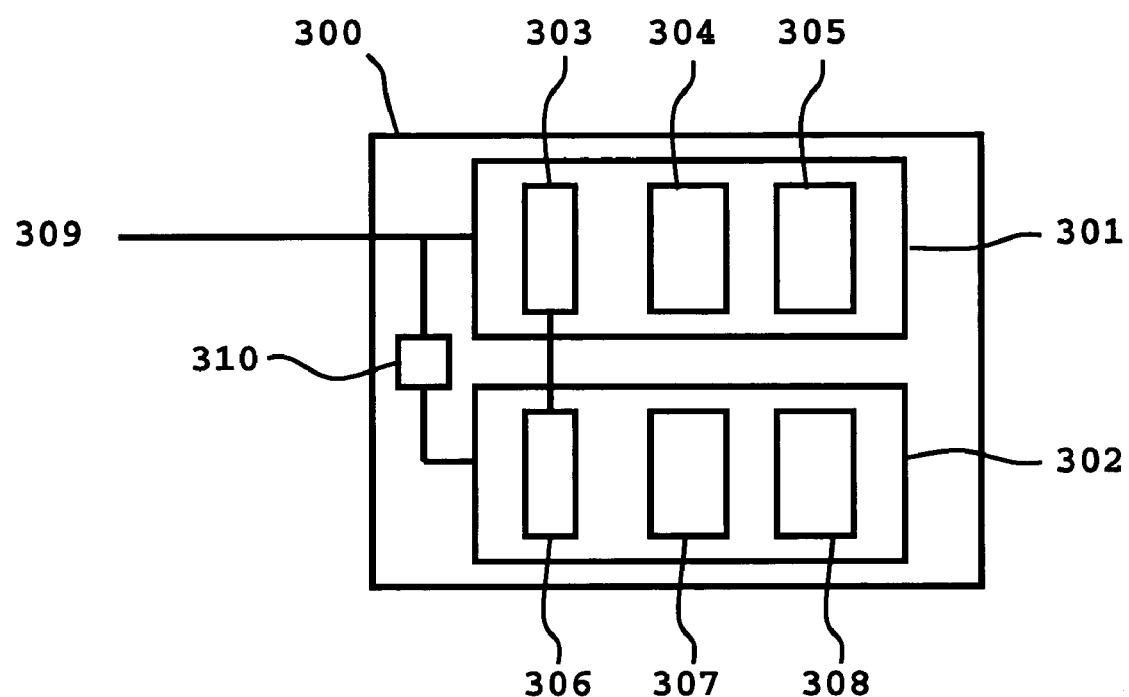
FIG. 3 is a schematic drawing of a second embodiment replica server system shown in an operating environment for the invention.

Turning now to FIG. 3, a second non-limiting, example embodiment of a replica server system 300 is schematically described.

The replica server system 300 comprises a primary replica 301 and a secondary replica 302. The primary replica 301 includes a primary communication module 303, a primary storage 304 and a primary processor 305. The secondary replica 302 likewise includes a secondary communication module 306, a secondary storage 307 and a secondary processor 308. As with the first embodiment in FIG. 1, any known component enabling communication, storing and processing could be utilised. Likewise, the different components could be separate units or integrated into one or more units. Other functionalities can also be included within the replicas 301, 302.

The primary communication module 303 and the secondary communication module 306 are linked (by wire or wireless) to enable communication between the primary replica 301 and secondary replica 302. The primary communication module 303 can also communicate with external sources (not shown) via communication link 309 (wire or wireless). In case of failure of the primary replica 301, the secondary replica 302 will become a new primary replica. In such case a router 310 will enable the secondary replica 302 to communicate with the external sources. The function of the router 310 could also be implemented (hardware or software) in the primary communication module 303 and the secondary communication module 306.

When input data arrives from an external source via communication link 309, the primary replica 301 will transfer the input data to the secondary replica 302 and then proceed by storing the input data in the primary storage 304 and process the input data in primary processor 305. Once acknowledgement or confirmation data is received from the secondary replica 302, the processed data can be output back to the external sources. When a next input data is received and transferred to the secondary replica 302 or when information data from the primary replica 301 indicate that the input data has been processed successfully, the secondary replica can store and process the input data.

All functionalities described in relation to FIG. 1 are applicable for this example embodiment also. Combinations between the shown example embodiments are also possible. For instance, the example embodiment in FIG. 3 can include more than one secondary replica, and the replicas in FIG. 1 can all include communication means for the internal communication between replicas.

Other embodiments and implementations are viable and fall within the scope of the accompanying claims.

I claim:

1. A method of improving replica server performance in a replica server system comprising a primary replica server including a primary storage for storing information and a primary processor, and a secondary replica server including a secondary storage and a secondary processor, comprising:

transferring input data from said primary replica server to said secondary replica server upon receiving same, storing said input data on said primary storage, processing said input data in said primary processor after storing said input data, thus creating original output data, sending confirmation data from said secondary replica server to said primary replica server upon receiving said input data, and sending out said original output data from said primary replica server upon receiving said confirmation data from said secondary replica server.

2. The method according to claim 1, wherein said input data is stored on said secondary storage and said input data is processed in said secondary processor, thus creating replica server output data.

3. The method according to claim 2, wherein said storing and processing in said secondary processor is postponed at least until a next input data is received from said primary replica server.

4. The method according to claim 2, wherein information data relating to the processing of input data is sent from said primary replica server and said storing and processing in said secondary processor is postponed until said information data indicate that said input data has been successfully processed by said primary processor.

5. A replica server system, comprising:

a primary replica server having a primary input, a primary output, a primary storage, and a primary processor, a secondary replica server, connected to the primary replica server, having a secondary input, a secondary output, a secondary storage, and a secondary processor, said primary replica server being configured to transfer received input data to said secondary replica server, store said input data on said primary storage, process said input data on said primary processor to create original output data, and send out said original output data through said primary output after receiving confirmation data from said secondary replica server that said input data has been received, and said secondary replica being configured to generate said confirmation data upon receiving said input data on said secondary input.

6. The replica server system according to claim 5, wherein said secondary replica server is further configured to store said input data in said secondary storage and process said input data in said secondary processor to create replica output data to said original output data.

7. The replica server system according to claim 6, wherein said secondary replica server is further configured to postpone storing said input data in said secondary storage and processing said input data in said secondary processor until a next input data has been received from said primary replica server.

8. The replica server system according to claim 6, wherein said primary replica server is configured to generate information data indicating which input data is being processed and to transfer said information data to said secondary replica server and said secondary replica server being configured to postpone storing said input data in said secondary storage and processing said input data in said secondary processor until it has received information data indicating that said input data has been successfully processed by said primary replica server.

9. A replica server system comprising
primary replica means;
secondary replica means;
means for communicating internally between said primary replica means and said secondary replica means and externally between said primary replica means and external sources, said means for communicating being configured to transfer input data received by said primary replica means to said secondary replica means;
means for storing said input data in said primary replica means;
means for processing said input data in said primary replica means, thus creating original output data;
means for generating confirmation data in said secondary replica means upon receiving said input data and transferring said confirmation data to said primary replica means via said means for communicating; and
means for outputting said original output data via said means for communicating when said original output data has been created and said confirmation data has been received.

10. The replica server system according to claim 9, wherein said secondary replica means further comprises:
means for storing said input data in said secondary replica means; and
means for processing said input data in said secondary replica means, thus creating replica output data.

11. The replica server system according to claim 10, wherein said secondary replica means comprises means for inhibiting said means for storing said input data in said secondary replica means and said means for processing said input data in said secondary replica means until a next input data is received from said primary replica means.

12. The replica server system according to claim 10, wherein said primary replica means further comprises means for generating information data indicating which input data has been processed by said primary replica means, said information data being transferable to said secondary replica means via said means for communicating, and said secondary replica means comprises means for inhibiting said means for storing said input data in said secondary replica means and said means for processing said input data in said secondary replica means until said secondary replica means has received said information data indicating that said means for processing said input data in said primary replica means has processed said input data.

* * * * *